US011325594B2

United States Patent
Jiang et al.

(10) Patent No.: US 11,325,594 B2
(45) Date of Patent: May 10, 2022

(54) SENSOR FUSION BASED ON INTERSECTION SCENE TO DETERMINE VEHICLE COLLISION POTENTIAL

(71) Applicant: GM Global Technology Operations LLC, Detroit, MI (US)

(72) Inventors: Shengbing Jiang, Rochester Hills, MI (US); Shuqing Zeng, Sterling Heights, MI (US); Prakash Mohan Peranandam, Rochester Hills, MI (US); Meng Jiang, Rochester Hills, MI (US); Jiyu Zhang, Sterling Heights, MI (US); Mohamed A. Layouni, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 104 days.

(21) Appl. No.: 16/785,771

(22) Filed: Feb. 10, 2020

(65) Prior Publication Data

US 2021/0245743 A1    Aug. 12, 2021

(51) Int. Cl.
 *B60W 30/095* (2012.01)
 *B60W 50/16* (2020.01)
 *G01S 13/931* (2020.01)
 *G01S 17/931* (2020.01)
 *B60W 30/09* (2012.01)

(52) U.S. Cl.
 CPC ........ *B60W 30/0956* (2013.01); *B60W 30/09* (2013.01); *B60W 50/16* (2013.01); *G01S 13/931* (2013.01); *G01S 17/931* (2020.01)

(58) Field of Classification Search
 CPC .. B60W 30/09; B60W 30/0956; B60W 50/16; G01S 17/931; G01S 13/931
 See application file for complete search history.

(56) References Cited

U.S. PATENT DOCUMENTS

| 10,019,901 | B1* | 7/2018 | Fields | G08G 1/096725 |
| 2018/0354512 | A1* | 12/2018 | Hu | G07C 5/0841 |
| 2018/0364723 | A1* | 12/2018 | Cullinane | G06K 9/00832 |
| 2019/0337511 | A1* | 11/2019 | Nguyen | B60W 40/04 |
| 2020/0192391 | A1* | 6/2020 | Vora | G08G 1/166 |
| 2020/0209860 | A1* | 7/2020 | Zhang | G05D 1/0231 |
| 2020/0336541 | A1* | 10/2020 | Naderi Alizadeh | H04W 4/38 |

* cited by examiner

*Primary Examiner* — Peter D Nolan
*Assistant Examiner* — Demetra R Smith-Stewart
(74) *Attorney, Agent, or Firm* — Cantor Colburn LLP

(57) ABSTRACT

Methods and systems to implement sensor fusion to determine collision potential for a vehicle include identifying a specific intersection that the vehicle is approaching, and identifying collision potential scenarios associated with one or more paths through the specific intersection. Each collision potential scenario defines a risk of a collision between the vehicle and an object in a specified area. A weight with which one or more information sources of the vehicle are considered is adjusted for each collision potential scenario such that a highest weight is given to one or more of the one or more information sources that provide most relevant and reliable information about the specified area. Sensor fusion is implemented based on the adjusting the weight of the one or more information sources and performing detection based on the sensor fusion, and an alert is provided or actions are implemented according to the detection.

20 Claims, 4 Drawing Sheets

SENSOR FUSION BASED ON INTERSECTION SCENE TO DETERMINE VEHICLE COLLISION POTENTIAL

INTRODUCTION

The subject disclosure relates to sensor fusion based on an intersection scene to determine vehicle collision potential.

Vehicles (e.g., automobiles, trucks, construction equipment, farm equipment, automated factory equipment) increasingly employ sensors to obtain information about the vehicle and its environment. The sensor information facilitates augmentation or automation of vehicle operation. Exemplary sensors include a camera, a radio detection and ranging (radar) system, and a light detection and ranging (lidar) system. Sensor fusion refers to using information from multiple sensors. Sensor fusion may be used to determine the potential for a vehicle collision, for example. However, the sensor information from every sensor may not be equally relevant. Accordingly, it is desirable to provide sensor fusion based on an intersection scene to determine vehicle collision potential.

SUMMARY

In one exemplary embodiment, a method of implementing sensor fusion to determine collision potential for a vehicle includes identifying a specific intersection that the vehicle is approaching, and identifying collision potential scenarios associated with one or more paths through the specific intersection. Each collision potential scenario defines a risk of a collision between the vehicle and an object in a specified area. The method also includes adjusting a weight with which one or more information sources of the vehicle are considered for each collision potential scenario such that a highest weight is given to one or more of the one or more information sources that provide most relevant and reliable information about the specified area corresponding with the collision potential scenario. Sensor fusion is implemented based on the adjusting the weight of the one or more information sources and performing detection based on the sensor fusion, and an alert is provided or actions are implemented according to the detection.

In addition to one or more of the features described herein, the identifying the specific intersection that the vehicle is approaching includes obtaining a location of the vehicle and referencing the location of the vehicle on a map that identifies a plurality of intersections.

In addition to one or more of the features described herein, the method also includes identifying the one or more of the one or more information sources that provide the most relevant and reliable information about the specified area corresponding with the collision potential scenario according to real time conditions, wherein the real time conditions include ambient light intensity and obstructed views of any of the information sources of the vehicle.

In addition to one or more of the features described herein, the method also includes considering only the collision potential scenarios associated with a specific one of the one or more paths through the specific intersection by identifying a driver intention to traverse the specific one of the one or more paths based on the vehicle being a driver-operated vehicle.

In addition to one or more of the features described herein, the identifying the driver intention includes obtaining a button or turn signal input of the driver or obtaining a location of the vehicle relative to routing information being provided to the driver.

In addition to one or more of the features described herein, identifying and storing the collision potential scenarios associated with the one or more paths through every intersection on a map, wherein the identifying the collision potential scenarios associated with the one or more paths through the specific intersection includes obtaining the collision potential scenarios from storage in real time.

In addition to one or more of the features described herein, the method also includes updating the weight with which the one or more information sources of the vehicle are considered for each upcoming collision potential scenario in real time based on real time conditions.

In addition to one or more of the features described herein, the real time conditions include quality of data from the one or more information sources or ambient light conditions.

In addition to one or more of the features described herein, the information sources include sensors, and the sensors include a camera, a radar system, or a lidar system, or the information sources include communication sources, and the communication sources include another vehicle, infrastructure, or a cloud-based server.

In addition to one or more of the features described herein, the providing the alert includes issuing a visual, auditory, or haptic alert, and the implementing the actions includes performing automatic braking.

In another exemplary embodiment, a system to implement sensor fusion to determine collision potential for a vehicle includes information sources of the vehicle, and a processor to identify a specific intersection that the vehicle is approaching, and to identify collision potential scenarios associated with one or more paths through the specific intersection. Each collision potential scenario defines a risk of a collision between the vehicle and an object in a specified area. The processor also adjusts a weight with which one or more of the information sources of the vehicle are considered for each collision potential scenario such that a highest weight is given to one or more of the one or more of the information sources that provide most relevant and reliable information about the specified area corresponding with the collision potential scenario. Sensor fusion is implemented based on the adjusting the weight of the one or more of the information sources. Detection is performed based on the sensor fusion, and an alert is provided or actions are implemented according to the detection.

In addition to one or more of the features described herein, the processor identifies the specific intersection that the vehicle is approaching by obtaining a location of the vehicle and referencing the location of the vehicle on a map that identifies a plurality of intersections.

In addition to one or more of the features described herein, the processor identifies the one or more of the one or more information sources that provide the most relevant and reliable information about the specified area corresponding with the collision potential scenario according to real time conditions. The real time conditions include ambient light intensity and obstructed views of any of the information sources of the vehicle.

In addition to one or more of the features described herein, the processor considers only the collision potential scenarios associated with a specific one of the one or more paths through the specific intersection by identifying a driver intention to traverse the specific one of the one or more paths based on the vehicle being a driver-operated vehicle.

In addition to one or more of the features described herein, the processor identifies the driver intention by obtaining a button or turn signal input of the driver or obtaining a location of the vehicle relative to routing information being provided to the driver.

In addition to one or more of the features described herein, the processor identifies and stores the collision potential scenarios associated with the one or more paths through every intersection on a map, and the processor identifies the collision potential scenarios associated with the one or more paths through the specific intersection by obtaining the collision potential scenarios from storage in real time.

In addition to one or more of the features described herein, the processor updates the weight with which the one or more information sources of the vehicle are considered for each upcoming collision potential scenario in real time based on real time conditions.

In addition to one or more of the features described herein, the real time conditions include quality of data from the one or more information sources or ambient light conditions.

In addition to one or more of the features described herein, the information sources include sensors, and the sensors include a camera, a radar system, or a lidar system, and the information sources include communication sources, and the communication sources include another vehicle, infrastructure, or a cloud-based server.

In addition to one or more of the features described herein, the alert is a visual, auditory, or haptic alert, and the actions include performing automatic braking.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
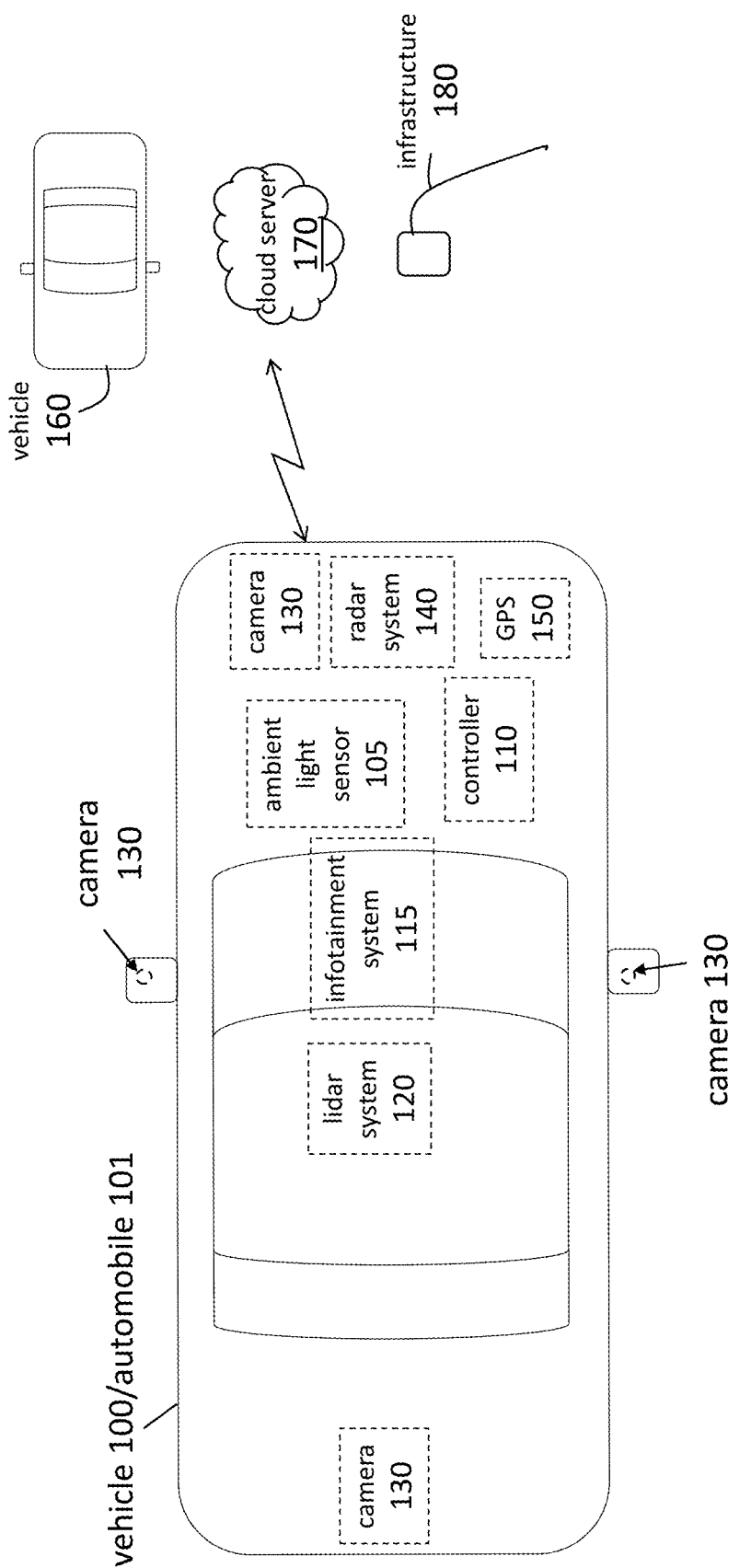
FIG. 1 is a block diagram of a vehicle that performs sensor fusion based on an intersection scene to determine vehicle collision potential according to one or more embodiments.

The following description is merely exemplary in nature and is not intended to limit the present disclosure, its application or uses. It should be understood that throughout the drawings, corresponding reference numerals indicate like or corresponding parts and features.

As previously noted, vehicle sensors may provide information that facilitates identifying a potential collision. The information provided by vehicle sensors is beneficial in driver-operated and semi-autonomous vehicles and vital in autonomous vehicle operation. Sensor fusion combines the information from multiple sensors. For example, a false alarm may be avoided by establishing that all sensors or a majority of sensors must detect an object or collision potential before such a detection is accepted. All sensors may be given equal weight according to a conventional sensor fusion algorithm. However, given a particular intersection scene, not every sensor may be equally relevant or reliable.

Embodiments of the systems and methods detailed herein relate to sensor fusion based on an intersection scene to determine vehicle collision potential. An intersection scene refers to a particular intersection and its real time conditions (e.g., ambient light, blocked views). Sensor information is weighted based on the relevance and reliability of the sensor for the particular intersection scene. A given intersection scene and a given path of the vehicle through the intersection may involve more than one collision potential scenario (e.g., path ahead, cross traffic). Each scenario may require a different weighting of the sensors that are part of the sensor fusion. As detailed, sensor fusion refers to the fusion of not only information from the sensors of the vehicle but also information from other sources.

In accordance with an exemplary embodiment, FIG. 1 is a block diagram of a vehicle 100 that performs sensor fusion based on an intersection scene 210 (FIG. 2), 310 (FIG. 3) to determine vehicle collision potential. As noted, an intersection scene 210, 310 refers to the intersection 200 (FIGS. 2, 3) and conditions (e.g., lighting, blocked views) that affect the relevancy and efficacy of a particular sensor of the vehicle 100. The exemplary vehicle 100 shown in FIG. 1 is an automobile 101 and may be driver-operated or autonomous. The vehicle 100 includes a controller 110 that obtains information from sensors such as an ambient light sensor 105, a lidar system 120, cameras 130, and a radar system 140 and performs the sensor fusion. The exemplary numbers and locations of the sensors in FIG. 1 are not intended to limit alternate embodiments. For example, the vehicle 100 may include multiple radar systems 140 (e.g., one each side of the vehicle 100 and at the center at both the front and back) or, additionally or alternately, multiple lidar systems 120.

Figure 2:
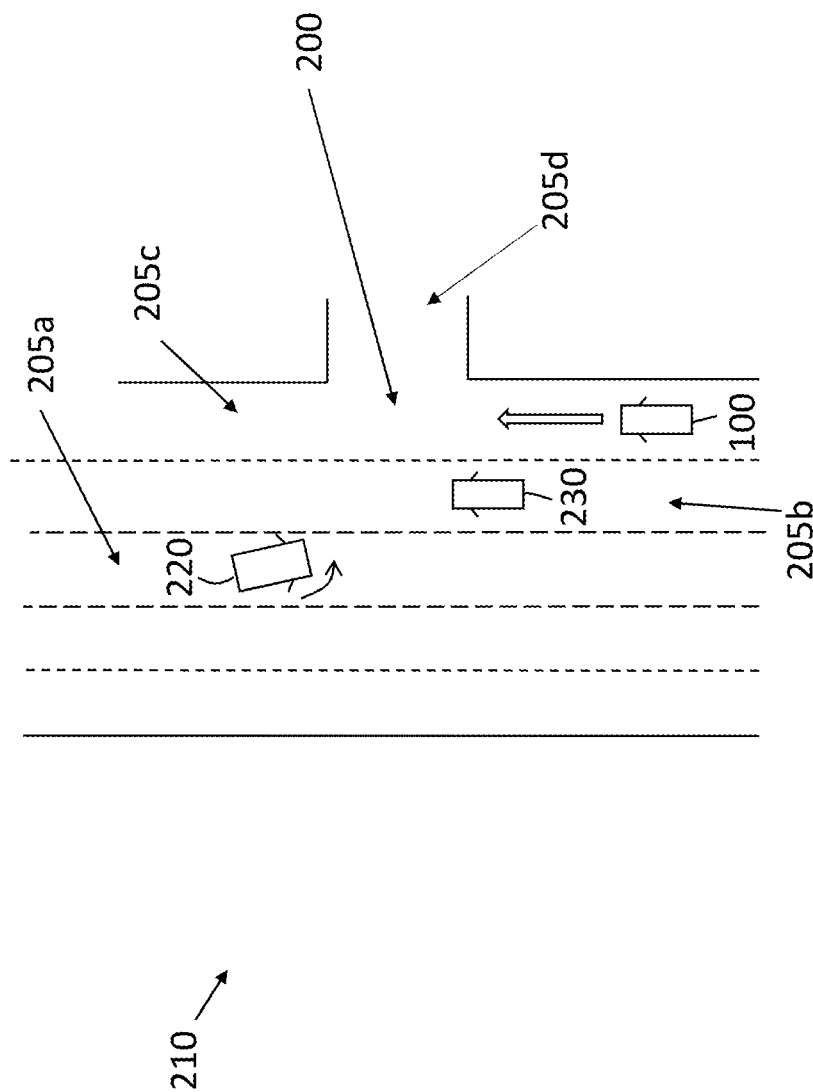
FIG. 2 illustrates sensor fusion based on an intersection scene to determine vehicle collision potential according to one or more embodiments.

The vehicle 100 is shown with a global positioning system (GPS) 150 that provides the position of the vehicle 100 and, in conjunction with mapping information, may allow the controller 110 to determine upcoming intersections 200 (FIG. 2). The controller 110 may use the GPS 150 and map to provide routing information to the driver, for example, in a driver-operated vehicle 100. The controller 110 may also communicate with other vehicles 160 via vehicle-to-vehicle (V2V) communication, with a cloud server 170 via vehicle-to-everything (V2X) communication, or with infrastructure 180 via vehicle-to-infrastructure (V2I) communication. In addition to obtaining information, the controller 110 may also provide information through an infotainment system 115 or other interface with the driver (in the driver-operated case) or operator (in the autonomous case) of the vehicle 100. The controller 110 may issue an alert or communicate with vehicle systems to perform automatic actions based on the determination of vehicle collision potential.

The controller 110 includes processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. As detailed with reference to FIG. 2, sensor fusion based on an intersection scene 210, 310 to determine vehicle collision potential refers to considering which sources of information are most relevant according to the particular intersection 200 and real time conditions in order to weight the information as part of sensor fusion.

Figure 3:
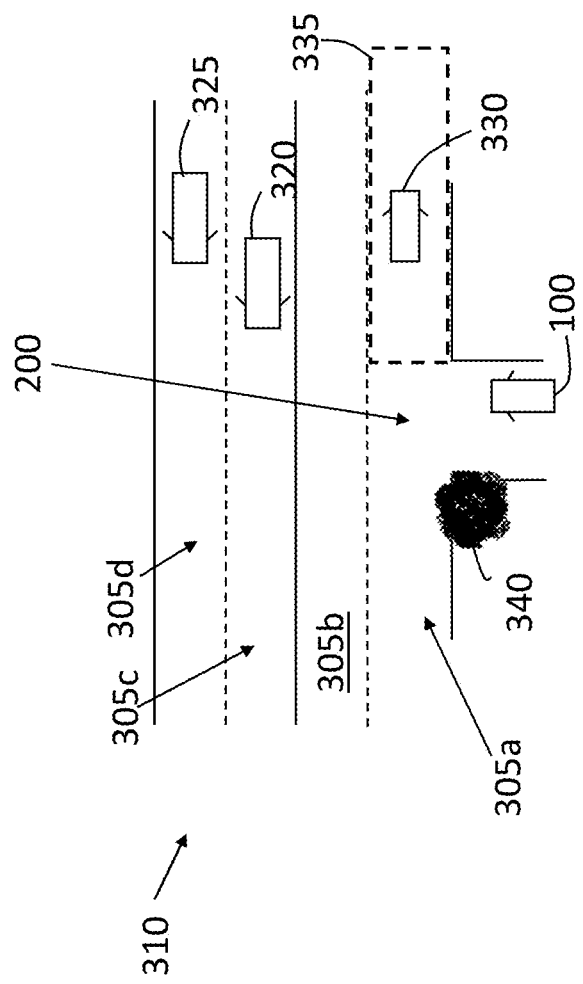
FIG. 3 illustrates sensor fusion based on an intersection scene to determine vehicle collision potential according to one or more embodiments.

FIG. 2 illustrates sensor fusion based on an intersection scene 210 to determine vehicle collision potential according to one or more embodiments. The intersection scene 210 is used to discuss aspects of an exemplary embodiment, and the intersection scene 310 shown in FIG. 3 is used to discuss additional aspects of the exemplary embodiment, all of which are summarized in FIG. 4. The intersection scene 210 shown in FIG. 2 relates to the intersection 200 and real time conditions (e.g., lighting, traffic flow) at the intersection 200. The vehicle 100 is travelling straight, a turning vehicle 220 is in the turn lane 205*a*. The turning vehicle 220 will cross the path of the vehicle 100 when it turns left. Another vehicle 230 is improperly stopped in a lane 205*b* that is adjacent to the lane 205*c* of the vehicle 100 in order to permit the turning vehicle 220 to turn left. The presence of the stopped vehicle 230 creates a blind spot for sensors of the vehicle 100 with regard to the turning vehicle 220.

The intersection 200 and the path of the vehicle 100 through the intersection 200 implicates more than one collision potential scenario. One collision potential scenario involves the turning lane 205*a*, and another involves the lane 205*d*. That is, a given collision potential scenario implicates an area from which an object might emerge and potentially collide with the vehicle 100. The sensors with a field of view that covers that area are the most relevant sensors and, thus, are likely to be weighted the most in the sensor fusion algorithm.

With regard to the turning lane 205*a*, the most relevant sensor may be camera 130 positioned at the center front of the vehicle 100. This sensor has a field of view that includes the turning lane 205*a* and, thus, may be given the highest weight. Because a portion of the turning lane 205*a* is obscured by the stopped vehicle 230, V2V communication or V2X communication that may indicate the presence of the turning vehicle 220 may be given a high weight (e.g., the same weight as the camera 130 at the center front of the vehicle 100). A rule-based mapping may be used to assign weights to the various sources of information to the controller 110 according to the intersection scene 210.

With regard to the lane 205*d*, a different weighting than the above-described weighting for the turning lane 205*a* may be used for sensor fusion. Alternately, based on its field of view, the camera 130 to the center front of the vehicle 100 may be given the most weight as with regard to turning lane 205*a*. In addition, the GPS 150 and map, which together indicate the location of the lane 205*d* relative to the vehicle 100, may be given equal weight to the camera 130 at the center right of the vehicle 100. If the ambient light sensor 105 is used, the detected ambient light intensity may affect the weighting given to the different sensors. For example, if the real time ambient light intensity is below a threshold value that corresponds with a minimum light intensity needed for the cameras 130, then giving additional weight to the camera 130 at the center front of the vehicle 100 would be unhelpful. Despite its location, the camera 130 would not provide relevant information due to the ambient light conditions. In this case, only the GPS 150 and map information may be weighted more than other sensors in detecting the upcoming lane 205*d*.

FIG. 3 illustrates sensor fusion based on an intersection scene 310 to determine vehicle collision potential according to one or more embodiments. The intersection 200 shown in FIG. 3 and other intersections 200 on a map available to the vehicle 100 may be pre-assessed for collision potential scenarios for different paths through the intersections 200. Thus, as the vehicle 100 approaches the intersection 200 shown in FIG. 3, the controller 110 determines which information from which source should be weighted more for each collision potential scenario.

The vehicle 100 may take one of several paths through the intersection 200 shown in the intersection scene 310. For example, the vehicle 100 may turn right into the lane 305*a* or into the lane 305*b*. As other examples, the vehicle 100 may turn left into the lane 305*c* or into the lane 305*d*. For any of these paths, a collision potential scenario involves the lane 305*a* to the left of the vehicle 100, assuming a right-side drive jurisdiction. Thus, a camera 130 or radar system 140 on the left front of the vehicle 100 may be given the highest weight according to a rule-based approach for this collision potential scenario. The intersection scene 310 includes a bush 340 that obstructs part of the view to the left of the vehicle 100. Thus, the rule may be modified to also increase the weight of V2V or V2X information about vehicles travelling in the lane 305*a* toward the intersection 200. For a left turn into either lane 305*c* or 305*d*, another collision potential scenario involves those lanes to the right of the vehicle 100, where the other vehicles 320 and 325 are shown. For that collision potential scenario, a camera or radar system 140 on the right front of the vehicle 100 may be given the highest weight.

The area 335 to the right of the vehicle 100 and the vehicle 330 in the area 335 are not relevant (i.e., not part of a collision potential scenario) if the vehicle 100 is turning left or turning right into the lane 305*b*. However, if the vehicle 100 is turning right into the lane 305*a*, then the vehicle 330 or any slow or stopped object in the area 335 are part of a relevant collision potential scenario. Thus, if the vehicle 100 starts turning into the lane 305*a*, the weighting of information from a camera 130 or radar system 140 at the front left of the vehicle 100 may be increased and, as the turn completes, the increased weight may be shifted to information from a camera 130 or radar system 140 in the center front of the vehicle 100.

When the vehicle 100 is driver-operated and driver intent (i.e., the intended path of the vehicle 100 through the intersection 200) can be determined, the controller 110 can anticipate how the sensor fusion weighting needs to change in real time. For example, the driver of the vehicle 100 may indicate the path that will be taken through an intersection 200 via a button or with a turn signal. As another example, the controller 110 may know an upcoming maneuver because the driver is using a routing navigation system based on the GPS 150 and the map. Based on knowledge of driver intention, the controller 110 knows the path and, consequently, the relevant collision potential scenarios through a given intersection 200. The controller 110 can change the weighting given to information from various sensors and other sources through the intersection 200 for each collision potential scenario in anticipation of encountering that collision potential scenario. Without information about driver intent, the controller 110 controls the weighting for each collision potential scenario that is encountered in real time. When the vehicle 100 is an autonomous vehicle, the upcoming paths are planned and known to the controller 110. Thus, the above-noted intent determination is not relevant, and only the collision potential scenarios in the intended path need to be considered for a given intersection 200.

Figure 4:
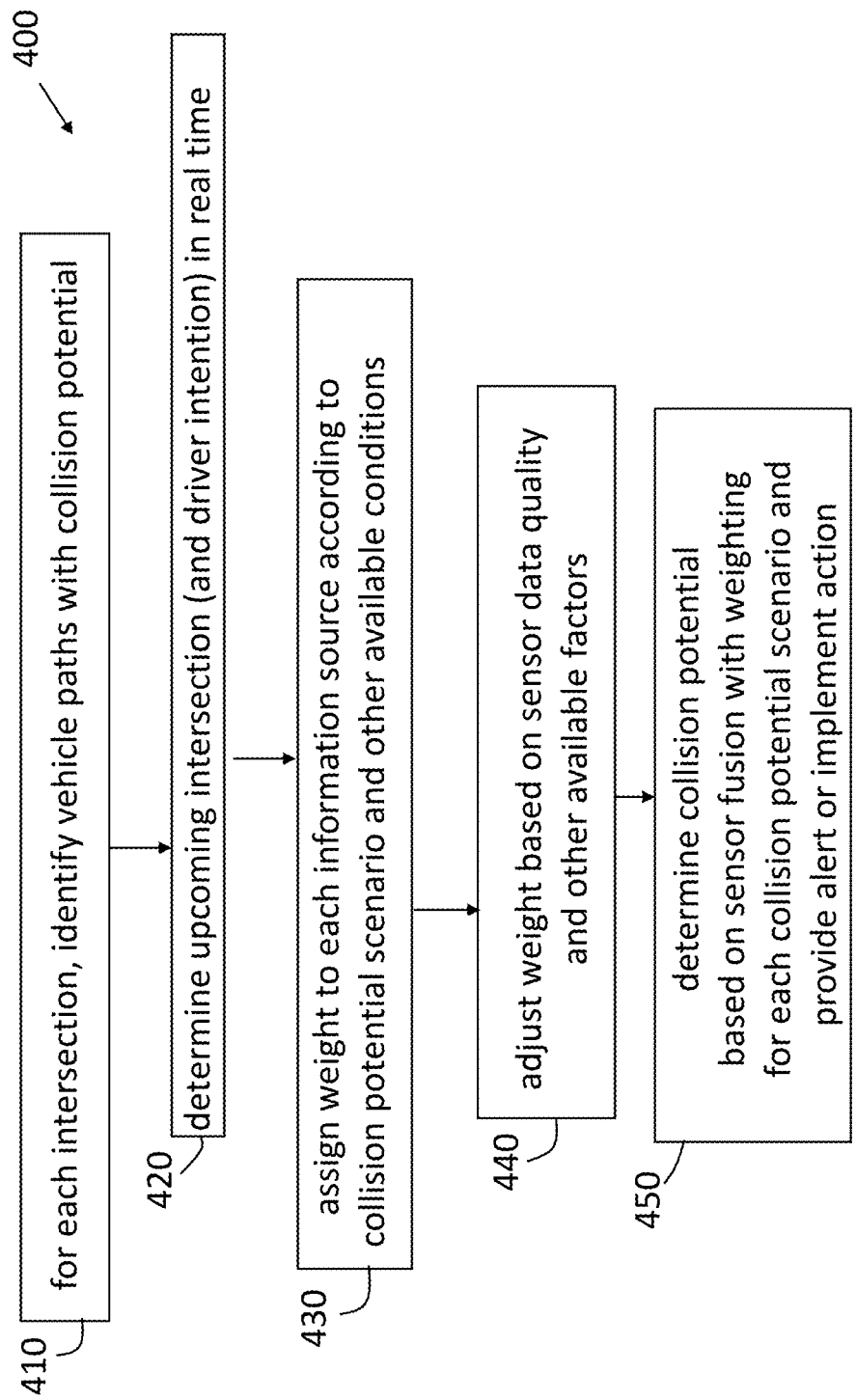
FIG. 4 is a process flow of a method of performing sensor fusion based on an intersection scene to determine vehicle collision potential according to one or more embodiments.

FIG. 4 is a process flow of a method 400 of performing sensor fusion based on an intersection scene to determine vehicle collision potential according to one or more embodiments. Continuing reference is made to FIGS. 1 to 3 in the discussion of FIG. 4. At block 410, identifying vehicle paths with collision potential for each intersection 200 may be done apriori, as previously noted. Thus, each collision potential scenario for each path through each intersection 200 may be stored by the controller 110 to more quickly identify the collision potential scenarios for an intersection 200 being approached in real time. At block 420, determining an upcoming intersection 200 may involve using the GPS 150 and the map. Optionally, at block 420, the processes may include determining driver intention in real time for a driver-operated vehicle 100. Driver intention refers to the specific path through the intersection 200 that the vehicle 100 will traverse, as previously noted. Determining the driver intention to traverse a specific path through the intersection 200 in real time means that only the collision potential scenarios associated with that path are considered in real time.

At block 430, the processes include assigning weight to each information source according to each collision potential scenario at the intersection 200 and other available conditions. When a vehicle 100 is at a T-stop, as shown in FIG. 3, for example, collision potential scenarios can involve the left and right sides of the vehicle 100, as discussed with reference to FIG. 3. In addition other available conditions (e.g., obstructions such as the bush 340, ambient light intensity) may affect which sources of information should be trusted the most. A rule-based approach may be used to assign weight to each information source based on all the information available or, according to alternate embodiments, to increase the weight of one or more sources of information at block 430. The sources of information could be one of the sensors (e.g., camera 130, lidar system 120, radar system 140) or communication (e.g., V2V communication, V2X communication).

Assigning weight to each information source (or increasing the weight of one or more information sources), at block 430, may additionally include assigning different weight to data (or increasing the weight of particular data) collected by a given information source during processing. For example, as discussed with reference to FIG. 2, the center front camera 130 of the vehicle 100 may be given highest weight for the collision potential scenario associated with the turning lane 205a. Additionally, image data from the portion of the field of view of the center front camera 130 corresponding with the turning lane 205a may be given higher weight than other image data during the processing of the image data obtained by the center front camera 130.

At block 440, adjusting the initial weighting, assigned at block 430, based on sensor data quality and other available factors involves determining if the rule-based result needs to be adjusted based on real time conditions. For example, if the camera 130 at the left front of the vehicle 100 is assigned the highest weight by the controller 110 based on a rule (at block 430) but snow is obscuring the field of view of the camera 130, the weighting may be adjusted. As another example, if the GPS 150 and map are assigned the highest weight but the map information is incorrect due to construction or another factor, the weighting may be adjusted at block 440.

At block 450, the processes include determining collision potential based on sensor fusion using the weighting assigned at blocks 430 and 440 for each collision potential scenario. The processes at block 450 also include providing an alert or implementing an action (alternately or additionally). An alert may be issued as the vehicle 100 approaches an intersection 200 and, alternately or additionally, at the intersection 200. The alert may be visual, auditory, haptic, or in more than one form. Alternate or additional to the alerts, autonomous actions (e.g., automatic braking) may be implemented based on the collision potential determined according to sensor fusion. The increased weight to a given sensor or other source of information in sensor fusion means that a lack of detection of a collision threat by other sensors or sources of information may be overruled if it is detected by the highest weight sensor or information source.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of implementing sensor fusion to determine collision potential for a vehicle, the method comprising:
    identifying, using a processor, a specific intersection that the vehicle is approaching;
    identifying, using the processor, collision potential scenarios associated with one or more paths through the specific intersection, wherein each collision potential scenario defines a risk of a collision between the vehicle and an object in a specified area;
    adjusting, using the processor, a weight with which one or more information sources of the vehicle are considered for each collision potential scenario such that a highest weight is given to one or more of the one or more information sources that provide most relevant and reliable information about the specified area corresponding with the collision potential scenario;
    implementing, using the processor, sensor fusion based on the adjusting the weight of the one or more information sources and performing detection based on the sensor fusion; and
    providing, using the processor, an alert or implementing actions according to the detection.

2. The method according to claim 1, wherein the identifying the specific intersection that the vehicle is approaching includes obtaining a location of the vehicle and referencing the location of the vehicle on a map that identifies a plurality of intersections.

3. The method according to claim 1, further comprising identifying the one or more of the one or more information sources that provide the most relevant and reliable information about the specified area corresponding with the collision potential scenario according to real time conditions, wherein the real time conditions include ambient light intensity and obstructed views of any of the information sources of the vehicle.

4. The method according to claim 1, further comprising considering only the collision potential scenarios associated with a specific one of the one or more paths through the specific intersection by identifying a driver intention to traverse the specific one of the one or more paths based on the vehicle being a driver-operated vehicle.

5. The method according to claim 4, wherein the identifying the driver intention includes obtaining a button or turn signal input of the driver or obtaining a location of the vehicle relative to routing information being provided to the driver.

6. The method according to claim 1, further comprising identifying and storing the collision potential scenarios associated with the one or more paths through every intersection on a map, wherein the identifying the collision potential scenarios associated with the one or more paths through the specific intersection includes obtaining the collision potential scenarios from storage in real time.

7. The method according to claim 1, further comprising updating the weight with which the one or more information sources of the vehicle are considered for each upcoming collision potential scenario in real time based on real time conditions.

8. The method according to claim 7, wherein the real time conditions include quality of data from the one or more information sources or ambient light conditions.

9. The method according to claim 1, wherein the information sources include sensors, and the sensors include a camera, a radar system, or a lidar system, or the information sources include communication sources, and the communication sources include another vehicle, infrastructure, or a cloud-based server.

10. The method according to claim 1, wherein the providing the alert includes issuing a visual, auditory, or haptic alert, and the implementing the actions includes performing automatic braking.

11. A system to implement sensor fusion to determine collision potential for a vehicle, the system comprising:
information sources of the vehicle; and
a processor configured to identify a specific intersection that the vehicle is approaching, to identify collision potential scenarios associated with one or more paths through the specific intersection, wherein each collision potential scenario defines a risk of a collision between the vehicle and an object in a specified area, to adjust a weight with which one or more of the information sources of the vehicle are considered for each collision potential scenario such that a highest weight is given to one or more of the one or more of the information sources that provide most relevant and reliable information about the specified area corresponding with the collision potential scenario, to implement sensor fusion based on the adjusting the weight of the one or more of the information sources, to perform detection based on the sensor fusion, and to provide an alert or implement actions according to the detection.

12. The system according to claim 11, wherein the processor is configured to identify the specific intersection that the vehicle is approaching by obtaining a location of the vehicle and referencing the location of the vehicle on a map that identifies a plurality of intersections.

13. The system according to claim 11, wherein the processor is further configured to identify the one or more of the one or more information sources that provide the most relevant and reliable information about the specified area corresponding with the collision potential scenario according to real time conditions, wherein the real time conditions include ambient light intensity and obstructed views of any of the information sources of the vehicle.

14. The system according to claim 11, wherein the processor is configured to consider only the collision potential scenarios associated with a specific one of the one or more paths through the specific intersection by identifying a driver intention to traverse the specific one of the one or more paths based on the vehicle being a driver-operated vehicle.

15. The system according to claim 14, wherein the processor is configured to identify the driver intention by obtaining a button or turn signal input of the driver or obtaining a location of the vehicle relative to routing information being provided to the driver.

16. The system according to claim 11, wherein the processor is further configured to identify and store the collision potential scenarios associated with the one or more paths through every intersection on a map, and the processor is configured to identify the collision potential scenarios associated with the one or more paths through the specific intersection by obtaining the collision potential scenarios from storage in real time.

17. The system according to claim 11, wherein the processor is further configured to update the weight with which the one or more information sources of the vehicle are considered for each upcoming collision potential scenario in real time based on real time conditions.

18. The system according to claim 17, wherein the real time conditions include quality of data from the one or more information sources or ambient light conditions.

19. The system according to claim 11, wherein the information sources include sensors, and the sensors include a camera, a radar system, or a lidar system, and the information sources include communication sources, and the communication sources include another vehicle, infrastructure, or a cloud-based server.

20. The system according to claim 11, wherein the alert is a visual, auditory, or haptic alert, and the actions include performing automatic braking.

* * * * *